(12) United States Patent
Pignataro et al.

(10) Patent No.: US 10,536,367 B2
(45) Date of Patent: Jan. 14, 2020

(54) MULTIPOINT SEAMLESS BI-DIRECTIONAL FORWARDING DETECTION

(71) Applicant: Cisco Technology, Inc., San Jose, CA (US)

(72) Inventors: Carlos M. Pignataro, Cary, NC (US); Nagendra Kumar Nainar, Morrisville, NC (US); Vengada Prasad Govindan, Chennai (IN); Pawel Piotr Sowinski, Sudbury, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/927,334

(22) Filed: Mar. 21, 2018

(65) Prior Publication Data

US 2019/0297005 A1    Sep. 26, 2019

(51) Int. Cl.
| | |
|---|---|
| *H04L 12/28* | (2006.01) |
| *H04L 12/761* | (2013.01) |
| *H04L 12/707* | (2013.01) |
| *H04L 1/00* | (2006.01) |
| *H04L 12/703* | (2013.01) |
| *H04L 12/723* | (2013.01) |
| *H04L 12/749* | (2013.01) |

(52) U.S. Cl.
CPC ............ *H04L 45/16* (2013.01); *H04L 1/0045* (2013.01); *H04L 45/22* (2013.01); *H04L 45/28* (2013.01); *H04L 45/50* (2013.01); *H04L 45/741* (2013.01)

(58) Field of Classification Search
CPC ....... H04L 45/16; H04L 45/741; H04L 45/50; H04L 1/0045; H04L 45/22; H04L 45/28; H04L 12/2801; H04L 29/06027; H04L 65/1069; H04L 12/66; H04L 12/5692; H04L 12/2834; H04L 7/0029; H04L 65/1026

See application file for complete search history.

(56) References Cited

U.S. PATENT DOCUMENTS

| | | | | |
|---|---|---|---|---|
| 7,933,295 | B2 * | 4/2011 | Thi | H04B 3/23 370/352 |
| 8,005,095 | B2 * | 8/2011 | Emmendorfer | H04L 12/2859 370/395.21 |

(Continued)

*Primary Examiner* — Phuc H Tran
(74) *Attorney, Agent, or Firm* — Merchant & Gould P.C.

(57) ABSTRACT

Multipoint seamless Bi-directional Forwarding Detection (BFD) may be provided. First, a discriminator and data identifying a headend device may be received by a node from the headend device. The discriminator may be received over a point-to-multipoint pseudowire between the node and the headend device. Next, the node may start a reflector session in response to receiving the discriminator. The reflector session may correspond to the discriminator and the data identifying the headend device. The reflector session may then receive a control packet from the headend device and determine that the control packet includes the discriminator. The control packet may be received over the point-to-multipoint pseudowire. Next, the reflector session on the node may send a reply packet to the headend device in response to determining that the control packet includes the discriminator. The reply packet may be sent over a unicast pseudowire between the node and the headend device.

20 Claims, 7 Drawing Sheets

(56) References Cited

U.S. PATENT DOCUMENTS

| | | | | |
|---|---|---|---|---|
| 2008/0151943 | A1* | 6/2008 | Lechleider | H04B 7/0413 370/529 |
| 2008/0239993 | A1* | 10/2008 | Pfeffer | H04L 12/14 370/259 |
| 2010/0272120 | A1* | 10/2010 | Liang | H04N 21/434 370/465 |
| 2014/0118112 | A1* | 5/2014 | Pugel | H04L 12/1895 340/7.58 |

* cited by examiner

MULTIPOINT SEAMLESS BI-DIRECTIONAL FORWARDING DETECTION

TECHNICAL FIELD

The present disclosure relates generally to forwarding detection.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to an electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
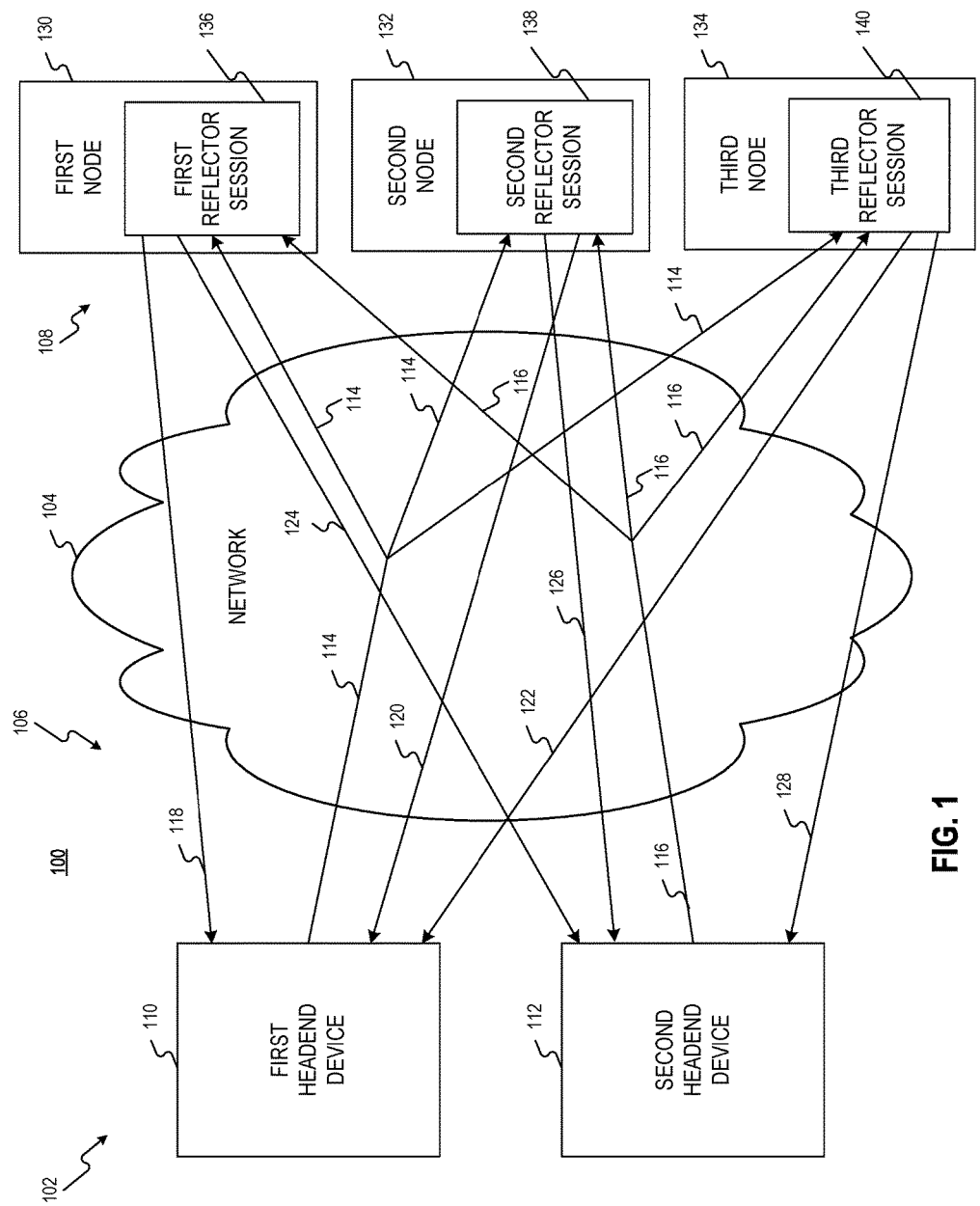
FIG. 1 is a block diagram of a system for providing multipoint seamless bi-directional forwarding detection.

Multipoint seamless Bi-directional Forwarding Detection (BFD) may be provided. First, a discriminator and data identifying a headend device may be received by a node from the headend device. Next, the node may start a reflector session in response to receiving the discriminator. The reflector session may correspond to the discriminator and the data identifying the headend device. The reflector session on the node may then receive a control packet from the headend device and determine that the control packet includes the discriminator. Next, the reflector session on the node may send a reply packet to the headend device in response to determining that the control packet includes the discriminator.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Converged Cable Access Platforms (CCAP) have evolved in a way that Physical Layer (PHY) devices may be remotely located (e.g., in Remote Physical Layer (R-PHY) nodes) and one or more R-PHY nodes may be connected to a CCAP core device located at a service provider's headend using, for example, Layer-2 Tunneling Protocol Version 3 (L2TPv3) Pseudowires (PWs). For traffic efficiency, CCAP core devices may leverage the multicast capability in a network (e.g., an Internet Protocol (IP) network) connecting the CCAP core device and the R-PHY nodes.

Consistent with embodiments of the disclosure, a CCAP core device may create a Point-to-Multiport (P2MP) pseudowire (i.e., a multicast pseudowire) to different R-PHY nodes that may be used to distribute multicast traffic (e.g., video and other multimedia traffic). As part of a Downstream External-Phy Interface (DEPI) architecture, Operations, Administration, and Maintenance (OAM) requirement for performing continuity checks between the CCAP core device and the R-PHY nodes over a P2MP pseudowire may not work with conventional systems. Accordingly, embodiments of the disclosure may extend Seamless Bi-directional Forwarding Detection (BFD) for P2MP scenarios and extend L2TPv3 protocol for discriminators and responding semantic signaling.

FIG. 1 is a block diagram of a system 100 for providing multipoint seamless bi-directional forwarding detection. As shown in FIG. 1, system 100 may comprise a plurality of headend devices 102, a network 104, a plurality of pseudowires 106, and a plurality of nodes 108. Plurality of headend devices 102 may comprise a first headend device 110 and a second headend device 112. Each of first headend device 110 and second headend device 112 may be located in a service provider's headend and may comprise CCAP core devices that may control and setup data paths with plurality of nodes 108 over network 104. Each of first headend device 110 and second headend device 112 may include a Cable Modem Termination System (CMTS) that may provide high speed data services, such as cable Internet or Voice Over Internet Protocol (VOIP) to users who may comprise service provider subscribers.

Network 104 may comprise a Packet Switched Network (PSN) that may forward packets. Network 104 may be embodied in a Hybrid Fiber-Coaxial (HFC) network and may use, but is not limited to, multiprotocol label switching (MPLS), Ethernet, Internet Protocol version 4 (IPv4), and Internet Protocol version 6 (IPv6).

Plurality of pseudowires 106 may comprise a first point-to-multipoint pseudowire 114 and a second point-to-multipoint pseudowire 116. Plurality of pseudowires 106 may further comprise a first unicast pseudowire 118, a second unicast pseudowire 120, a third unicast pseudowire 122 a fourth unicast pseudowire 124, a fifth unicast pseudowire 126, and a sixth unicast pseudowire 128. Plurality of pseudowires 106 may tunnel data traffic through a PSN such as network 104 for example.

Plurality of nodes 108 may comprise a first node 130, a second node 132, and a third node 134. First node 130 may include a first reflector session 136, second node 132 may include a second reflector session 138, and third node 134 may include a third reflector session 140. Plurality of nodes 108 may comprise R-PHY nodes where the physical layer (i.e., PHY) of a conventional cable headend CMTS may be shifted to fiber nodes (e.g., R-PHY nodes) in a network comprising plurality of nodes 108. First reflector session 136, second reflector session 138, and third reflector session 140 may be embodied in hardware and/or in software (including firmware, resident software, micro-code, etc.).

As shown in FIG. 1, first point-to-multipoint pseudowire 114 may comprise a multicast pseudowire that may tunnel multicast data traffic through network 104 from first headend device 110 to first node 130, second node 132, and third node 134. Similarly, second point-to-multipoint pseudowire 116 may comprise a multicast pseudowire that may tunnel multicast data traffic through network 104 from second headend device 112 to first node 130, second node 132, and third node 134.

First unicast pseudowire 118 may comprise a unicast pseudowire that may tunnel unicast data traffic through network 104 from first node 130 to first headend device 110. Second unicast pseudowire 120 may comprise a unicast pseudowire that may tunnel unicast data traffic through network 104 from second node 132 to first headend device 110. And third unicast pseudowire 122 may comprise a unicast pseudowire that may tunnel unicast data traffic through network 104 from third node 134 to first headend device 110.

Fourth unicast pseudowire 124 may comprise a unicast pseudowire that may tunnel unicast data traffic through network 104 from first node 130 to second headend device 112. Fifth unicast pseudowire 126 may comprise a unicast pseudowire that may tunnel unicast data traffic through network 104 from second node 132 to second headend device 112. And sixth unicast pseudowire 128 may comprise a unicast pseudowire that may tunnel unicast data traffic through network 104 from third node 134 to second headend device 112.

Figure 2:
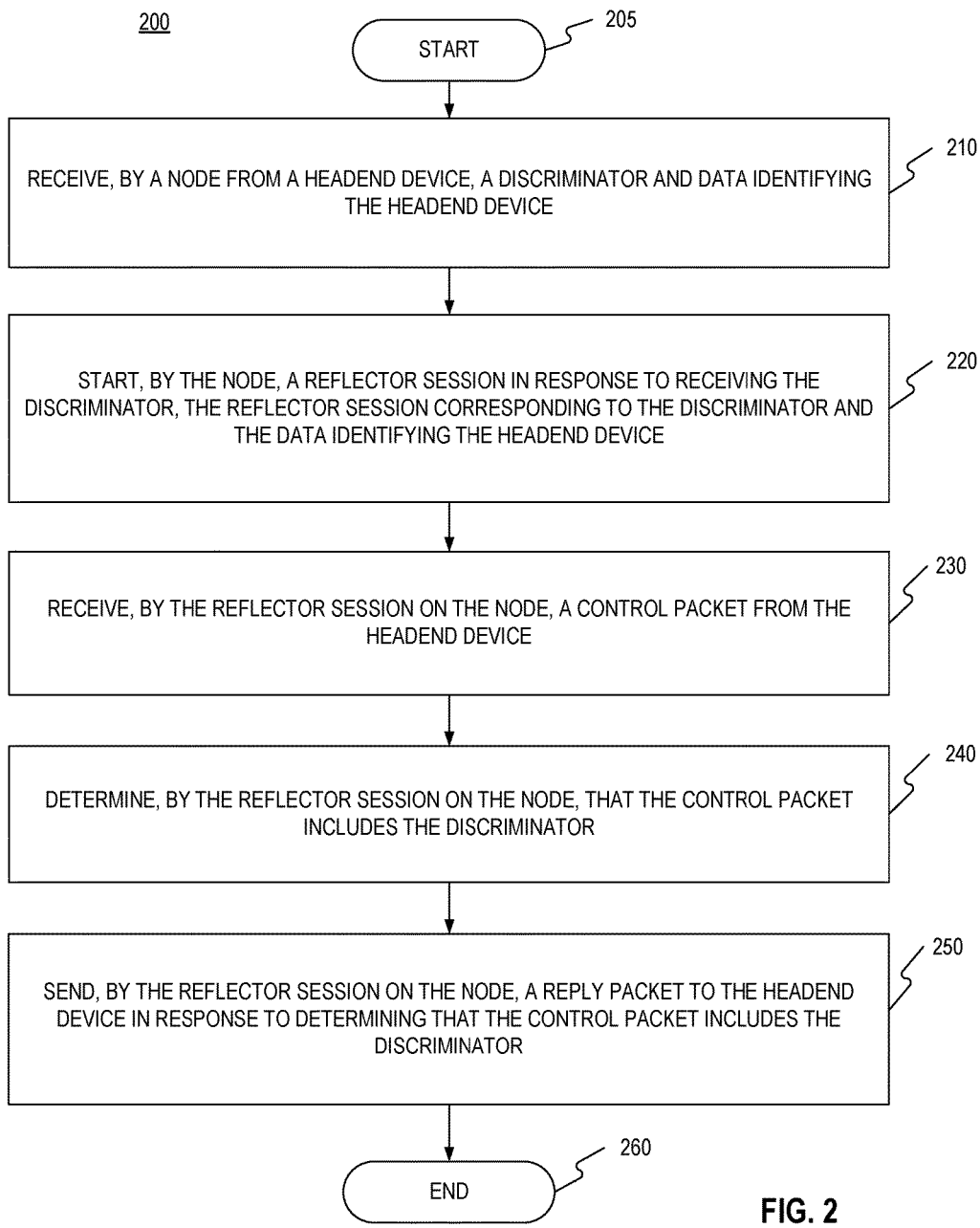
FIG. 2 is a flow chart of a method for providing multipoint seamless bi-directional forwarding detection.

FIG. 2 is a flow chart setting forth the general stages involved in a method 200 consistent with an embodiment of the disclosure for providing multipoint seamless Bi-directional Forwarding Detection (BFD). Method 200 may be implemented using first node 130 and first headend device 110, either of which may be embodied by a computing device 500 as described in more detail below with respect to FIG. 5. Ways to implement the stages of method 200 will be described in greater detail below.

Method 200 may begin at starting block 205 and proceed to stage 210 where first node 130 may receive, from first headend device 110, a discriminator and data identifying first headend device 110. For example, each of plurality of nodes 108 may be assigned and may receive a discriminator from each of plurality of headend devices 102. The discriminator may be exchanged using L2TPv3 extensions. Because first node 130, second node 132, and third node 134 may be part of the same P2MP pseudowire (i.e., first point-to-multipoint pseudowire 114) from first headend device 110, first node 130, second node 132, and third node 134 may all receive the same discriminator (e.g., 0x01010101) from first headend device 110 for this P2MP pseudowire. Similarly, because first node 130, second node 132, and third node 134 may be part of the same P2MP pseudowire (i.e., second point-to-multipoint pseudowire 116) from second headend device 112, first node 130, second node 132, and third node 134 may all receive the same discriminator (e.g., 0x02020202) from second headend device 112 for this P2MP pseudowire.

If plurality of nodes 108 were to receive the same discriminator from different headend devices of plurality of headend devices 102, this may break the discriminators' uniqueness. In order to address this problem, consistent with embodiments of the disclosure, first headend device 110 and second headend device 112 may be pre-assigned with a range of unique discriminators. For example, first headend device 110 may be assigned a discriminator range={0x01010101–0x11111111} and second headend device 112 may be assigned a discriminator range={0x02020202–0x22222222}. From the above example, this may result in a reflector table at first node 130 shown in Table 1 where first point-to-multipoint pseudowire 114 from first headend device 110 may have discriminator=0x01010101 and first headend device 110 may have a source address of MAC-1. Similarly, second point-to-multipoint pseudowire 116 from second headend device 112 may have discriminator=0x02020202 and second headend device 112 may have a source address of MAC-2.

TABLE 1

| Discriminator | Data Identifying Headend Device |
| --- | --- |
| 0x01010101 | MAC-1 |
| 0x02020202 | MAC-2 |

Another way to address this problem, consistent with embodiments of the disclosure, may be for plurality of nodes 108 to use an L2TPv3 header (i.e., source address of a sending headend devices) as context identifier for a received discriminator. Consequently, if two headend devices were to assign the same discriminator, the source address of a sending headend device may be used as context identifier. For example, this may result in a reflector table at first node 130 shown in Table 2 where first point-to-multipoint pseudowire 114 from first headend device 110 may have discriminator=0x01010101 and first headend device 110 may have a source address of MAC-1. Similarly, second point-to-multipoint pseudowire 116 from second headend device 112 may have discriminator=0x01010101 and second headend device 112 may have a source address of MAC-2. While these two point-to-multipoint pseudowires may have the same discriminator, the uniqueness may be resolved by the aforementioned context identifier.

TABLE 2

| Discriminator | Data Identifying Headend Device |
| --- | --- |
| 0x01010101 | MAC-1 |
| 0x01010101 | MAC-2 |

From stage 210, where first node 130 receives the discriminator and the data identifying first headend device 110, method 200 may advance to stage 220 where first node 130 may start first reflector session 136 in response to receiving the discriminator. First reflector session 136 may correspond to the discriminator and the data identifying first headend device 110. For example, first node 130 may receive over first point-to-multipoint pseudowire 114 the discriminator (e.g., 0x01010101) assigned by first headend device 110 for first point-to-multipoint pseudowire 114. In response to receiving this discriminator, first node 130 may create a local reflector session (i.e., first reflector session 136) with a semantic to reflect a reply to a control packet having this discriminator over a corresponding unicast pseudowire (i.e., first unicast pseudowire 118) to first headend device 110.

Figure 3:
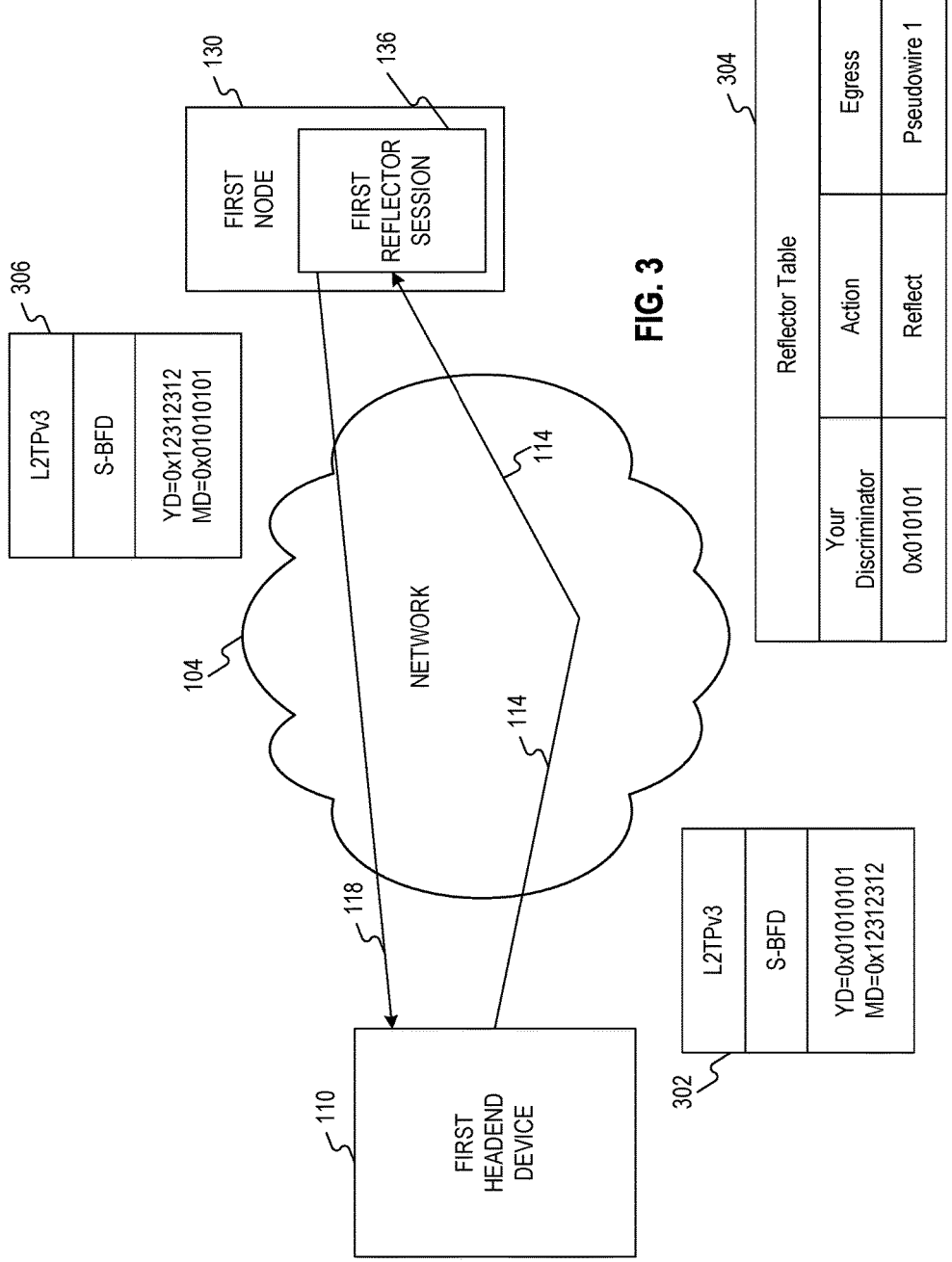
FIG. 3 is a block diagram showing control packet and rely packet behavior.

Once first node 130 starts first reflector session 136 in stage 220, method 200 may continue to stage 230 where first reflector session 136 on first node 130 may receive a control packet 302, as shown in FIG. 3, from first headend device 110. For example, control packet 302 may include a discriminator corresponding to first headend device 110 (e.g., My Discriminator (MD)=0x12312312) and a discriminator corresponding to first node 130 (e.g., Your Discriminator (YD)=0x01010101).

After first reflector session 136 on first node 130 receives control packet 302 from first headend device 110 in stage 230, method 200 may proceed to stage 240 where first reflector session 136 on first node 130 may determine that control packet 302 includes the discriminator. For example, first reflector session 136 may parse control packet 302 to obtain the YD (e.g., 0x01010101) and use it to perform a look up in reflector table 304 shown in FIG. 3. The look up may result in first reflector session 136 determining that YD from control packet 302 exists in reflector table 304 and thus determines that control packet 302 includes the discriminator.

From stage 240, where first reflector session 136 on first node 130 determines that the control packet includes the discriminator, method 200 may advance to stage 250 where first reflector session 136 on first node 130 may send a reply packet 306, as shown in FIG. 3, to first headend device 110 in response to determining that the control packet includes the discriminator. For example, as a result of the aforementioned look up in reflector table 304, an egress point (e.g., pseudowire 1) on first node 130 corresponding to the discriminator may also be returned to first reflector session 136. Pseudowire 1 may identify first unicast pseudowire 118 as the connection on which to send reply packet 306 to first headend device 110. For example, first node 130, on receiving control packet 302 over a P2MP pseudowire, may reply back over a unicast pseudowire.

Upon receiving reply packet 306 from first node 130, first headend device 110 may determine that there is continuity between first node 130 and first headend device 110. Once first reflector session 136 on first node 130 sends reply packet 306 to first headend device 110 in stage 250, method 200 may then end at stage 260.

One behavior for embodiments of the disclosure is for the headend devices to get a reply from all of the nodes. However, depending on the number of nodes that are part of same P2MP pseudowire, the headend devices may receive a lot of replies. Accordingly, embodiments of the disclosure may control the replies from the nodes, using for example, a bitmask based discriminator as shown in FIG. 4A, a grouping based discriminator FIG. 4B, or a unicast based discriminator as shown in FIG. 4C.

Figure 4A:
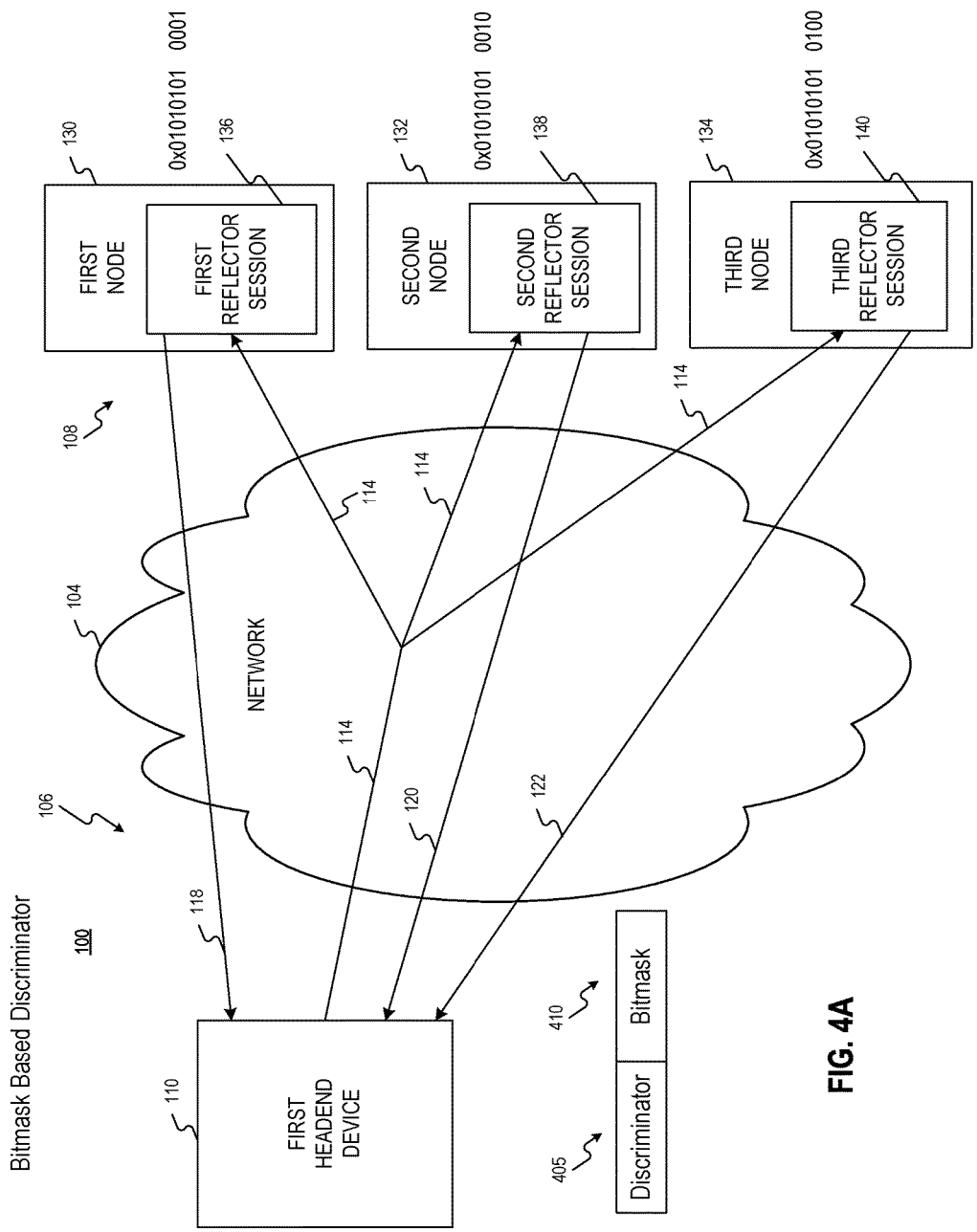
FIG. 4A shows a bitmask based discriminator.

As shown in FIG. 4A, a unique bit position may be assigned to each of plurality of nodes 108. A portion of a discriminator (e.g., first portion 405) may be the value assigned to the P2MP pseudowire and the remaining portion (e.g., second portion 410) may include the bitmask. In the example shown in FIG. 4A, first reflector session 136 may reply to 0x01010101 0001, second reflector session 138 may reply to 0x01010101 0010, and third reflector session 140 may reply to 0x01010101 0100. Both first reflector session 136 and second reflector session 138 may reply to 0x01010101 0011. And all reflector session may replay to 0x01010101 0111.

Figure 4B:
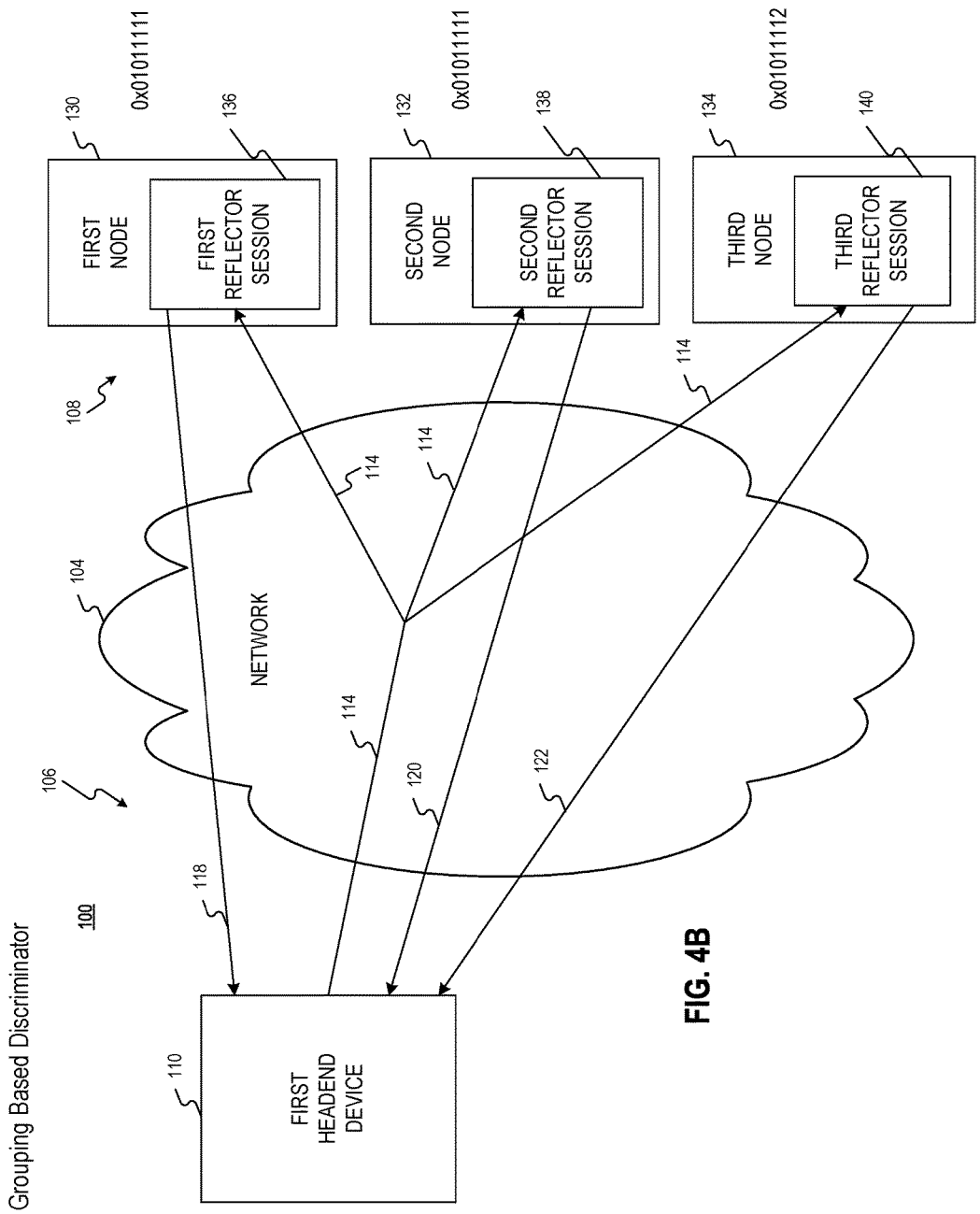
FIG. 4B shows a grouping based discriminator.

As shown in FIG. 4B, a set of nodes within the same P2MP pseudowire may be grouped as a responder-set. Each such group may be assigned with same discriminator. Headend devices may use a relevant discriminator to get a reply for selective nodes. In the FIG. 4B example, first node 130 and second node 132 may be grouped while third node 134 may be in a different group. Accordingly, first node 130 and second node 132 may create first reflector session 136 and second reflector session 138 for 0x01011111 while third node 134 may create third reflector session 140 for 0x01011112. Consequently, plurality of headend devices 102 may use YD=0x01011111 or 0x01011112 to control replies to control packets. While all of plurality of nodes 108 may receive the control packets, only those with corresponding reflector session may reply back.

Figure 4C:
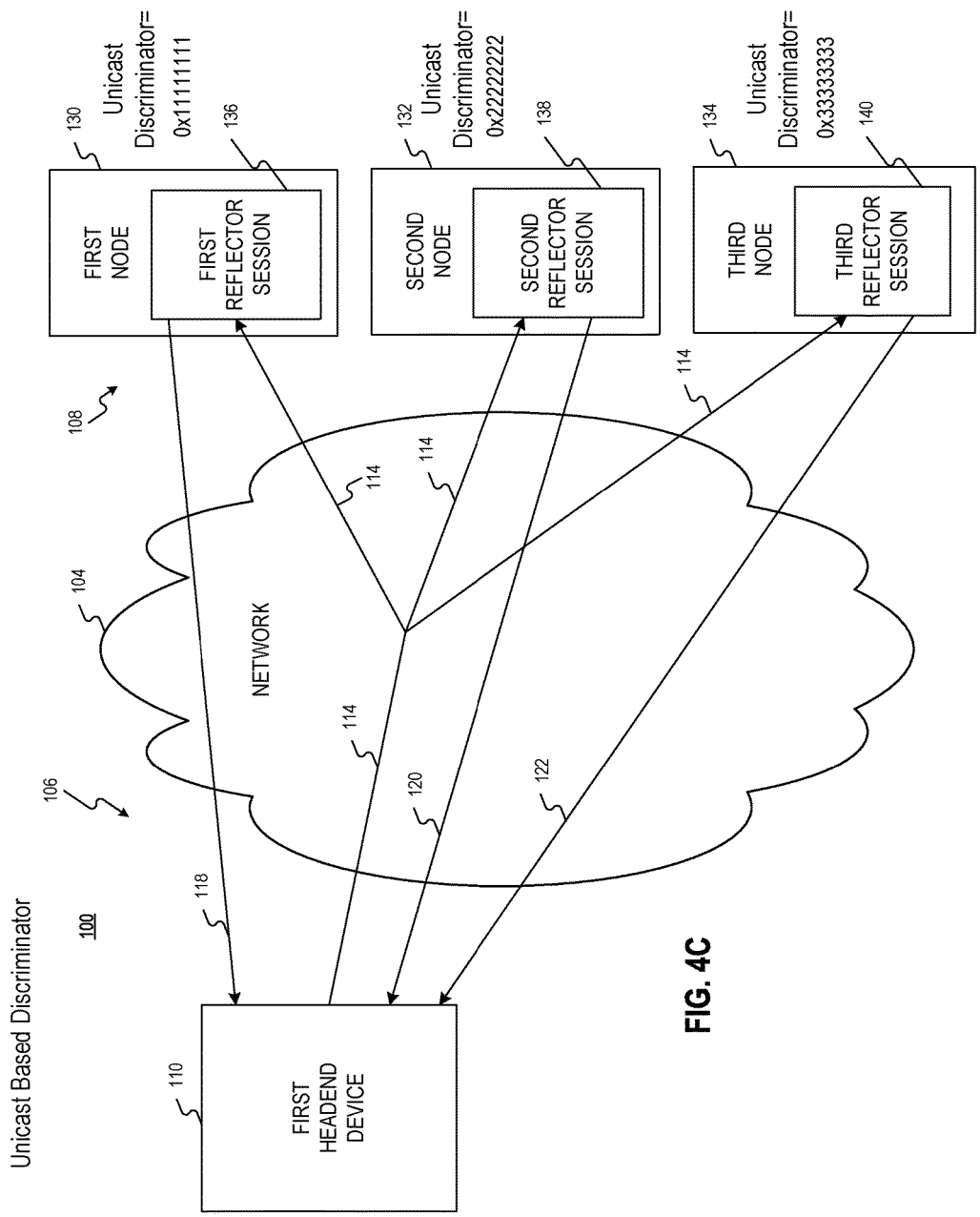
FIG. 4C shows a unicast based discriminator.

As shown in FIG. 4C, plurality of headend devices 102 may include the YD as the unicast discriminator of specific nodes and forward it over a P2MP pseudowire. All nodes on the corresponding P2MP pseudowire may receive it, but may discard because it may not match a local discriminator on the node. Nodes with corresponding unicast pseudowires may reply back.

Furthermore, embodiments of the disclosure may signal a return path using Label-Switched Path LSP bootstrapping. The return packet may be controlled by: i) nodes replying back via unicast Pseuodwire to a headend device; ii) nodes replying back via shortest IP path to a headend device; and iii) nodes replying back via strict IP path to a headend device. This may be achieved using different discriminators. For example, referring back to the example, of FIG. 3, first headend device 110 may assign different discriminators with return paths and signal them via L2TPv3 extensions. Then first node 130 may create different local reflector sessions with relevant YD and the associated return paths as illustrated below in Table 3.

TABLE 3

| Your Discriminator | Action | Egress |
| --- | --- | --- |
| 0x010101 | Reflect | Pseudowire 1 |
| 0x010111 | Reflect | IP to CCAP MAC-1 |
| 0111111111 | Reflect | Strict Path to CCAP MAC-1 |

Figure 5:
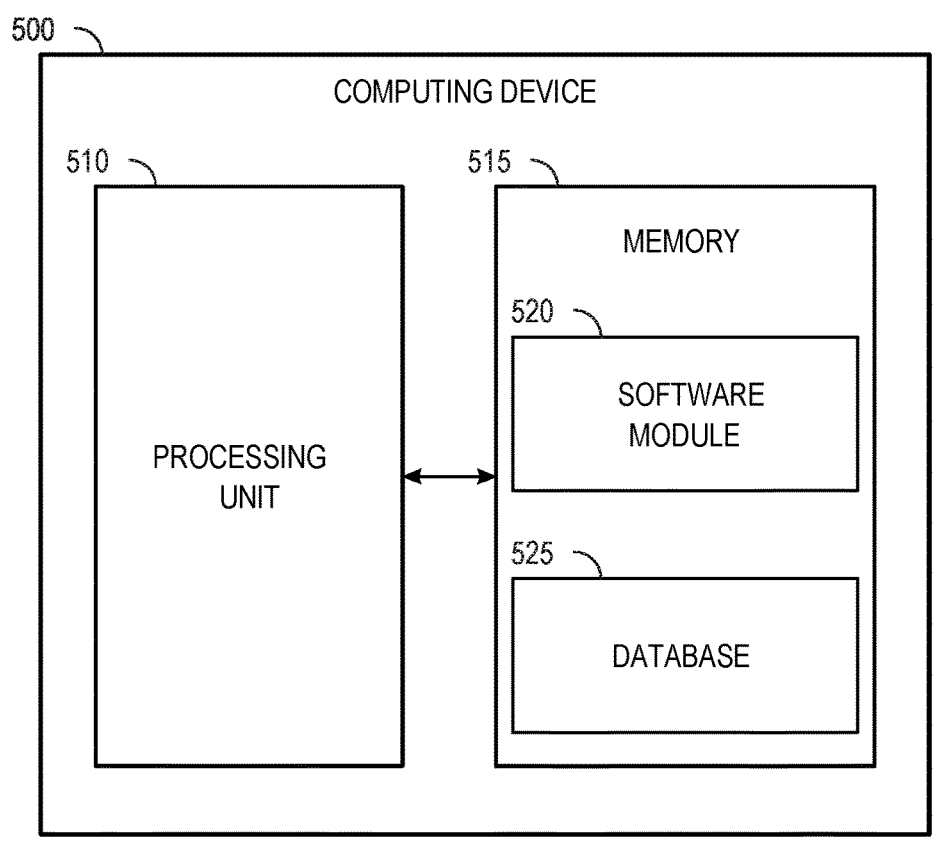
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing multipoint seamless Bi-directional Forwarding Detection (BFD), including for example, any one or more of the stages from method 200 described above with respect to FIG. 2. Computing device 500, for example, may provide an operating environment for any of plurality of headend devices 102 or any of plurality of nodes 108. Any of plurality of headend devices 102 or any of plurality of nodes 108 may operate in other environments and are not limited to computing device 500.

Computing device 500 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving, by a node from a headend device, a discriminator and data identifying the headend device;
   starting, by the node, a reflector session in response to receiving the discriminator, the reflector session corresponding to the discriminator and the data identifying the headend device;
   receiving, by the reflector session on the node, a control packet from the headend device;
   determining, by the reflector session on the node, that the control packet includes data corresponding to the discriminator; and
   sending, by the reflector session on the node, a reply packet to the headend device in response to determining that the control packet includes the discriminator.

2. The method of claim 1, wherein receiving, by the node from the headend device, comprises receiving by the node comprising a Remote Physical Layer (R-PHY) node.

3. The method of claim 1, wherein receiving, by the node from the headend device, comprises receiving from the headend device comprising a Converged Cable Access Platform (CCAP)) core.

4. The method of claim 1, wherein receiving the discriminator comprises receiving the discriminator over a point-to-multipoint pseudowire between the node and the headend device.

5. The method of claim 1, wherein receiving the discriminator comprises receiving the discriminator over a point-tomultipoint pseudowire between the node and the headend device wherein the point-to-multipoint pseudowire corresponds to the discriminator.

6. The method of claim 1, wherein receiving the control packet comprises receiving the control packet over a point-to-multipoint pseudowire between the node and the headend device.

7. The method of claim 1, wherein receiving the control packet comprises receiving the control packet over a point-to-multipoint pseudowire between the node and the headend device wherein the point-to-multipoint pseudowire corresponds to the discriminator.

8. The method of claim 1, wherein sending the reply packet to the headend device comprises sending the reply packet over a unicast pseudowire between the node and the headend device wherein the unicast pseudowire corresponds to the data identifying the headend device.

9. The method of claim 1, further comprising assigning, by the headend device, the discriminator to the node.

10. The method of claim 1, further comprising assigning, by the headend device, the discriminator to the node wherein the discriminator includes a bitmask.

11. The method of claim 1, further comprising assigning, by the headend device, the discriminator to the node wherein the discriminator corresponds to a subset of a plurality of nodes serviced by the headend device, the node being in the subset of the plurality of nodes serviced by the headend device.

12. The method of claim 1, further comprising assigning, by the headend device, the discriminator to the node wherein the discriminator is unique to the node wherein the node is one of a plurality of nodes serviced by the headend device.

13. The method of claim 1, further comprising:
receiving, by the headend device, the reply packet from the node; and
determining, by the headend device, that there is continuity between the node and the headend device in response to the headend device receiving the reply packet.

14. A system comprising:
a memory storage; and
a processing unit coupled to the memory storage, wherein the processing unit is operative to:
receive, from a headend device, a discriminator and data identifying the headend device;
start a reflector session in response to receiving the discriminator, the reflector session corresponding to the discriminator and the data identifying the headend device;
receive, by the reflector session, a control packet from the headend device;
determine, by the reflector session, that the control packet includes data corresponding to the discriminator; and
send, by the reflector session, a reply packet to the headend device in response to determining that the control packet includes the discriminator.

15. The system of claim 14, wherein the processing unit being operative to receive the discriminator comprises the processing unit being operative to receive the discriminator over a point-to-multipoint pseudowire wherein the point-to-multipoint pseudowire corresponds to the discriminator.

16. The system of claim 14, wherein the processing unit being operative to receive the control packet comprises the processing unit being operative to receive the control packet over a point-to-multipoint pseudowire wherein the point-to-multipoint pseudowire corresponds to the discriminator.

17. The system of claim 14, wherein the processing unit being operative to send the reply packet to the headend device comprises the processing unit being operative to send the reply packet over a unicast pseudowire wherein the unicast pseudowire corresponds to the data identifying the headend device.

18. A computer-readable medium that stores a set of instructions which when executed perform a method executed by the set of instructions comprising:
receiving, by a node from a headend device, a discriminator and data identifying the headend device;
starting, by the node, a reflector session in response to receiving the discriminator, the reflector session corresponding to the discriminator and the data identifying the headend device;
receiving, by the reflector session on the node, a control packet from the headend device; and
sending, by the reflector session on the node, a reply packet to the headend device in response to determining that the control packet includes the discriminator.

19. The computer-readable medium of claim 18, wherein receiving the control packet comprises receiving the control packet over a point-to-multipoint pseudowire between the node and the headend device wherein the point-to-multipoint pseudowire corresponds to the discriminator.

20. The computer-readable medium of claim 18, wherein sending the reply packet to the headend device comprises sending the reply packet over a unicast pseudowire between the node and the headend device wherein the unicast pseudowire corresponds to the data identifying the headend device.

* * * * *